M. G. HARLEY.
HEADLIGHT.
APPLICATION FILED JULY 2, 1917. RENEWED JUNE 30, 1919.

1,328,992.

Patented Jan. 27, 1920.
2 SHEETS—SHEET 1.

Melvin G. Harley
INVENTOR

By George J. Ottseh
ATTORNEY.

M. G. HARLEY.
HEADLIGHT.
APPLICATION FILED JULY 2, 1917. RENEWED JUNE 30, 1919.
1,328,992.
Patented Jan. 27, 1920.
2 SHEETS—SHEET 2.
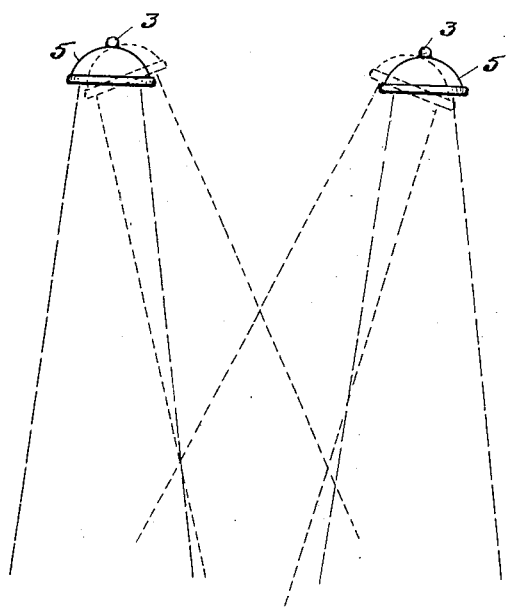
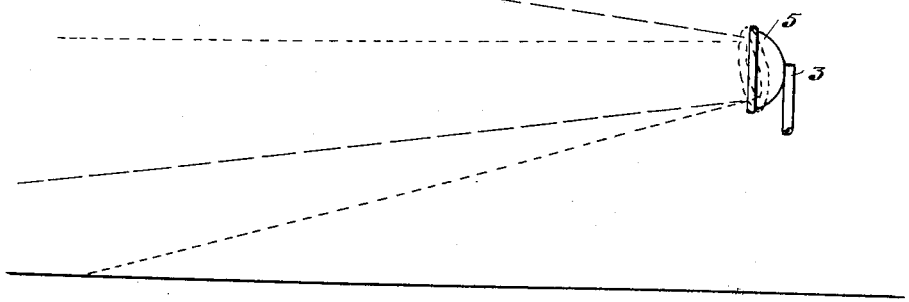
Melvin G. Harley
INVENTOR
By George J. Ottseh
ATTORNEY.

UNITED STATES PATENT OFFICE.

MELVIN G. HARLEY, OF SOUTH BEND, INDIANA.

HEADLIGHT.

1,328,992. Specification of Letters Patent. Patented Jan. 27, 1920.

Application filed July 2, 1917, Serial No. 178,251. Renewed June 30, 1919. Serial No. 307,780.

*To all whom it may concern:*

Be it known that I, MELVIN G. HARLEY, a citizen of the United States, residing at South Bend, in the county of St. Joseph and State of Indiana, have invented certain new and useful Improvements in Headlights, of which the following is a specification.

This invention relates to an improvement in head lights designed particularly for motor vehicles.

The main object of the present invention is to provide head lights which are adapted for turning, but which are adjusted in such turning movement entirely at the will of the driver and without regard to the direction of the vehicle. A particularly important feature resides in the fact that the head lights of the present improvement are adapted to simultaneously turn toward each other, the result of the turning of the head lights toward each other in their adjustment providing for a crossing of the light beams ahead of the vehicle, to thereby illuminate the road in advance and to both sides of the vehicle, as well as directly in front of the vehicle.

A further object of the invention is mounting the head lights on standards inclined from the vertical, so that the lights in their adjustment described will be lowered in projection from their normal plane, to obtain a stronger lighting effect directly in front of the vehicle, that is, concentrating the light closer to the vehicle, and furthermore to so lower the light rays as to avoid the blinding of the operators approaching the vehicles.

The invention in the preferred form is illustrated in the accompanying drawings in which:—

Fig. 5 is a plan view illustrating diagrammatically the light projection of the head lights in normal position and in one of the adjusted positions.

Fig. 6 is an elevation illustrating diagrammatically the lowering of the light beam as the head light is adjusted.

Figure 1:
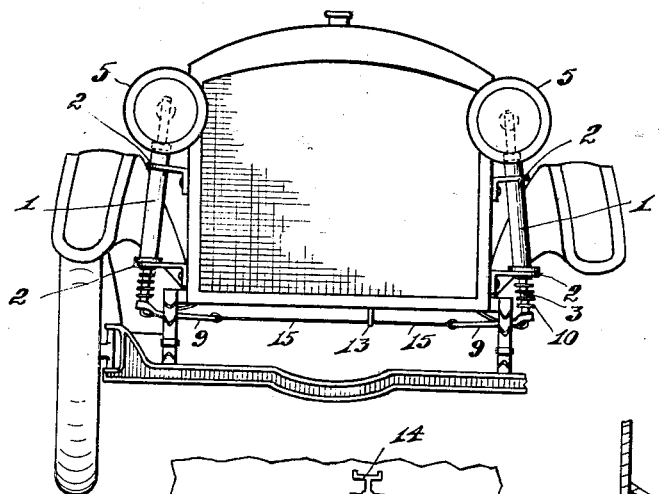
Figure 1 is a broken front elevation of a motor vehicle illustrating the application of the improved head lights thereto.
Figure 3:
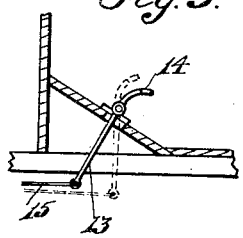
Fig. 3 is a sectional view showing a foot lever for the operation of the head lights.

The improved head lights, which are of identical type, are in the preferred form here shown as comprising upright hollow standards 1, supported adjacent the respective ends in brackets 2, secured to the radiator or to other appropriate part of the vehicle. The respective brackets for each standard are of somewhat different lengths in their projection beyond the vehicle connection, the upper bracket being of somewhat less length than the lower bracket, so that the standards incline inwardly and upwardly, that is the respective brackets converge from their lower ends.

Mounted in each standard 1, is a hollow rod 3, which rod projects above the standard and is provided with a collar 4 to rest upon the upper end of the standard to thereby support the rod rotatively within the standard. The usual head light structure 5, including the reflector and other parts is secured upon the upper end of the rod 3, and this rod, which as previously stated, is hollow, also serves as a conduit for the electric conductors 6. The lamp sockets 7 may also be secured to the rod if desired, though the details of the light structure utilized in the present invention are not important.

Figure 4:
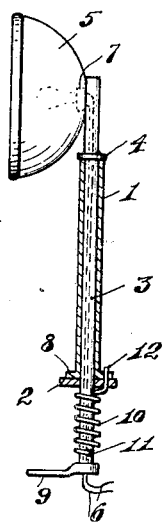
Fig. 4 is a sectional view partly in elevation illustrating the mounting of the particular light.
Figure 2:
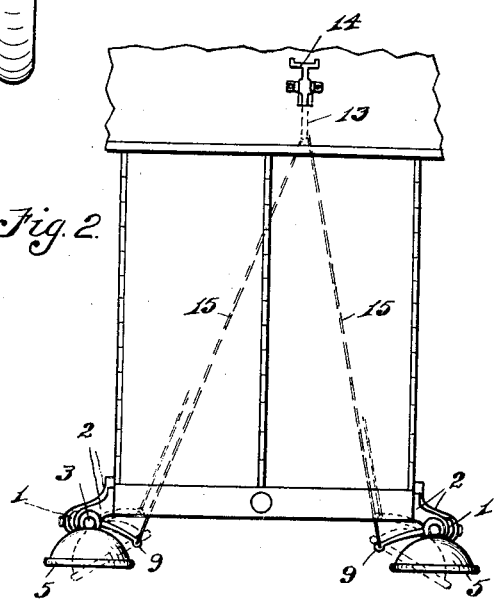
Fig. 2 is a broken plan illustrating more particularly the control means for the head lights.

The standard 1 preferably rests upon the lower bracket 2, the end of the standard having a lateral flange 8 to provide a proper bearing at this point. The rod 3 extends below the lower bracket and has secured to its lower end an operating arm 9, which arm extends laterally from the rod. A spring 10 is coiled about the rod 3, below the lower bracket, the lower end of the spring being fixed to the rod, as at 11 and the upper end thereof secured to the bracket and standard, preferably by projecting a suitable length 12 of the spring through registering holes in the bracket and standard. In any turning movement of the rod 3 in adjusting the head lights, the spring is under tension as will be obvious from Fig. 4, so that the head lights automatically turn to normal or parallel relation when the operating means is actuated.

An adjusting means for the head light is mounted within convenient reach of the driver, and while the invention contemplates any means to secure this result, such means is here shown as the lever 13 pivotally supported upon the bottom board of the vehicle body within convenient reach of the driver. The lever has an operative end 14 preferably shaped to receive the foot of the driver, and the opposite end of said lever is connected by connectors 15, which may be of any desired type, to the arms 9 of the respective rods 3.

It is apparent that the driver may by suitable operation of the lever 13 turn the head lights 5 toward each other, to any desired degree within the limits of the working parts, and that this turning of the head lights will put the spring 10 under tension to cause the head lights to turn to normal positions upon the release of the pressure on the lever 13.

Fig. 5 illustrates more particularly the light effect of the particular movement of the head lights here described. It will be noted that in normal position the light rays project in parallelism, or substantially parallel paths, which by reason of the divergence of the light rays from the respective lights, focus the light rays from both lamps at a distance considerably in advance of the vehicle. Through the adjustment of the head lights herein provided for the light rays therefrom may be caused to cross each other at practically any desired point in advance of the vehicle between the normal focusing point and the vehicle. This operation results in a crossing of the light rays and the projecting of the light beams to both sides of the road in advance of the vehicle so that the road on both sides is well lighted, through direct light rays, to thus provide the necessary illumination for turning. Furthermore, the crossing of the light rays results in sufficient diffusion of light to maintain the road directly ahead of the vehicle and for a serviceable distance in advance of the vehicle comparatively well lighted.

Furthermore, it will be noted, particularly from Fig. 1, that the respective lights are mounted on inclined supports and that in the rotation of these supports in the adjustment of the head lights the light rays are lowered. This is particularly plain from Fig. 6, and results in an added strength of light at a comparatively short distance ahead of the vehicle and on both sides thereof, while at the same time avoiding glare in the eyes of the driver of an approaching vehicle, as the light rays are in practically all adjustments of the head lights maintained below a height corresponding to that of the head light proper.

The invention is of particular importance in providing for an illumination of both sides of the road in advance of the vehicle, as a result of direct light rays, and this without sacrificing to any material degree a proper lighting on the road directly in advance of the vehicle. In other words, the improved head lights cross the light beams from the respective reflectors so that the light is directly projected to each side of the vehicle rather than directly in advance of the vehicle. The essential details reside in the divergent mounting of the head lights and in the means whereby they may be adjusted or turned toward each other. The specific arrangement of details here shown, while preferred, are merely illustrative of one form of structure to accomplish the result desired, and the scope of the depending claims will make clear that any and all equivalents of such details are contemplated for use.

Having thus described the invention, what is claimed as new, is:—

1. The combination with head lights, of means for rotatively supporting the lights, and means connecting the lights for simultaneously turning the same in the direction of each other.

2. The combination with head lights, of means for rotatively supporting the lights, means connecting the lights for simultaneously turning the lights in the direction of each other, and means for automatically returning the lights to normal position.

3. The combination with head lights, of means for supporting the lights for axial movement in relatively inclined planes, and means connecting the lights for simultaneous movement thereof.

4. The combination with head lights, of means for supporting the lights for axial movement in relatively inclined planes, means connecting the lights for simultaneous movement thereof, and means for returning the lights to normal position.

5. The combination with head lights, of supporting members therefor disposed at relatively inclined angles, means for rotatively supporting said members, and connections between the members for actuating the same in unison.

6. The combination with head lights, of rods supporting the same, a mounting for each rod arranged to support the rods for rotation at relatively inclined angles, an operating member, and connections between said member and rods for rotating the latter in unison.

7. A head light, a rod supporting the light, a standard rotatably supporting the rod, and mounted at an inclination to the vertical, and means for turning the rod in the standard.

8. A head light, a rod supporting the light, a standard rotatably supporting the rod and mounted at an inclination to the vertical, means for turning the rod in the standard, and means connected to the rod for automatically returning the same to normal position.

9. The combination with a motor vehicle, of head lights, standards mounted thereon, and disposed at an angle to the vertical, rods rotatably supported in the standards, head lights carried by the rods, arms secured to the rods, an operating member, and connections between said member and arms.

10. The combination with a motor vehicle, of head lights, standards mounted thereon, and disposed at an angle to the vertical, rods rotatably supported in the standards, head lights carried by the rods, arms secured to the rods, an operating member, and connections between said member and arms, and springs secured upon the rods to normally return said rods to normal position following their operation.

In testimony whereof I affix my signature.

MELVIN G. HARLEY.